United States Patent
Rudbeck et al.

Patent Number: 5,705,916
Date of Patent: Jan. 6, 1998

[54] PROCESS FOR THE GENERATION OF ELECTRICAL POWER

[75] Inventors: Poul Rudbeck, Fredensborg; Kim Aasberg-Petersen, Virum; Susanne Lægsgaard Jørgensen, Nœrum; Poul Erik Højlund Nielsen, Fredensborg, all of Denmark

[73] Assignee: Haldor Topsoe A/S, Lyngby, Denmark

[21] Appl. No.: 587,581

[22] Filed: Jan. 17, 1996

[30] Foreign Application Priority Data

Jan. 20, 1995 [DK] Denmark ............... DK0070/95

[51] Int. Cl.$^6$ ............... H02N 3/00; E02C 6/18
[52] U.S. Cl. ............... 322/2 R; 322/100; 60/39.02; 60/39.12; 60/39.17
[58] Field of Search ............... 322/2 R; 290/2; 60/39.02, 39.12, 39.17

[56] References Cited

U.S. PATENT DOCUMENTS

| | | | |
|---|---|---|---|
| 4,830,834 | 5/1989 | Stahl et al. | 422/190 |
| 4,935,037 | 6/1990 | Koyama et al. | 48/94 |
| 4,985,231 | 1/1991 | Lywood | 423/652 |
| 5,313,782 | 5/1994 | Frutschi et al. | 60/39.17 |
| 5,410,869 | 5/1995 | Muller | 60/39.02 |
| 5,482,791 | 1/1996 | Shingai et al. | 429/23 |
| 5,541,014 | 7/1996 | Micheli et al. | 429/19 |
| 5,562,754 | 10/1996 | Kang et al. | 95/54 |

Primary Examiner—Steven L. Stephan
Assistant Examiner—Nicholas Ponomarenko

[57] ABSTRACT

A process for generating electrical power in a gas turbine cycle including an air compression stage, first and second gas combustion stages, and a series of first and second gas expansion stages. Mechanical power is provided for the generation of electrical power in a rotating power generator. The first combustion stage is operated on hydrogen-depleted fuel gas at high pressure using air from the air compression stage. The hydrogen-depleted fuel gas is obtained by endothermic catalytic steam reforming of a hydrocarbon feed gas. Heat for the endothermic steam reforming is supplied by indirect heat exchange with heat from hot exhaust gas from the second expansion stage. The second combustion stage is operated at lower pressure than the first combustion stage on exhaust gas from the first expansion stage and the hydrogen-enriched gas separated form the hydrogen depleted gas. The hydrogen-enriched gas is separated from the hydrogen-depleted fuel gas during the catalytic steam reforming of the feed gas.

2 Claims, 1 Drawing Sheet

PROCESS FOR THE GENERATION OF ELECTRICAL POWER

BACKGROUND OF THE INVENTION

1. Field of the Invention

The present invention is directed to the generation of electrical power. In particular, the invention concerns certain improvements in power generation in a chemically recuperative gas turbine cycle.

2. Description of the Related Art

Conventional power plants, operating on natural gas, comprise an air compressor, a high pressure combustor and a gas expander. Compressed air from the compressor and natural gas are combusted in the combustor to deliver high temperature combustion gas, which is decompressed in the expander. During decompression, mechanical energy is developed in the expander, being shaft connected to a rotating generator. The highest cycle efficiency presently obtained with the above gas turbine system approaches 40% and recent developments within gas fuel turbines cycles are therefore directed to obtaining higher efficiencies.

Lately, various gas turbine cycles with improved efficiency by recuperation of gas turbine exhaust have been proposed, including chemical recuperation of valuable heat in turbine exhaust.

In the recuperative gas turbine cycles, sensible heat from the turbine exhaust gas is transformed into additional heat of fuel either by preheating the compressed air prior to combustion or by converting natural gas to fuel with a higher fuel value.

Certain types of chemically recuperative gas turbine cycles utilize heat from the turbine exhaust to perform catalytic steam reforming of natural gas. Natural gas, mainly consisting of methane, is steam reformed to a gas mixture of hydrogen and carbon oxides with a considerably higher fuel value than methane. Necessary heat for the endothermic steam reforming reactions is by the recuperative gas turbine cycles supplied by heat from the hot turbine exhaust.

Chemically recuperative gas turbine cycles known in the art conventionally comprise a two stage combustion and expansion cycle. Steam reformed natural gas is in a first stage combusted with compressed air from an air compressor and expanded in a first expander. Exhaust from the first expander is further mixed with steam reformed gas and after a second combustion stage expanded in a second expander. Hot exhaust from the second expander is then introduced into a heat exchange steam reformer for utilization of heat contained in the exhaust.

The conventional two stage chemically recuperative gas turbine cycles have proven efficiency of up to 50%.

SUMMARY OF THE INVENTION

This invention provides an improved process for the generation of electrical power in a gas turbine cycle comprising an air compression stage, first and second gas combustion stages and a series of first and second gas expansion stages providing mechanical power for the generation of electrical power in a rotating power generator, the improvement of which comprises steps of operating the first combustion stage on hydrogen depleted fuel gas at high pressure and air from the air compression stage, the hydrogen depleted fuel gas is obtained by endothermic catalytic steam reforming of a hydrocarbon feed gas;

supplying heat for the endothermic steam reforming by indirect heat exchange with heat from hot exhaust gas from the second expansion stage;

separating hydrogen enriched gas from the hydrogen depleted fuel gas during the catalytic steam reforming of the feed gas; and operating the second combustion stage at lower pressure than the first combustion stage on exhaust gas from the first expansion stage and the hydrogen enriched gas being separated from the hydrogen depleted gas.

DETAILED DESCRIPTION OF THE PREFERRED EMBODIMENTS

Figure 1:
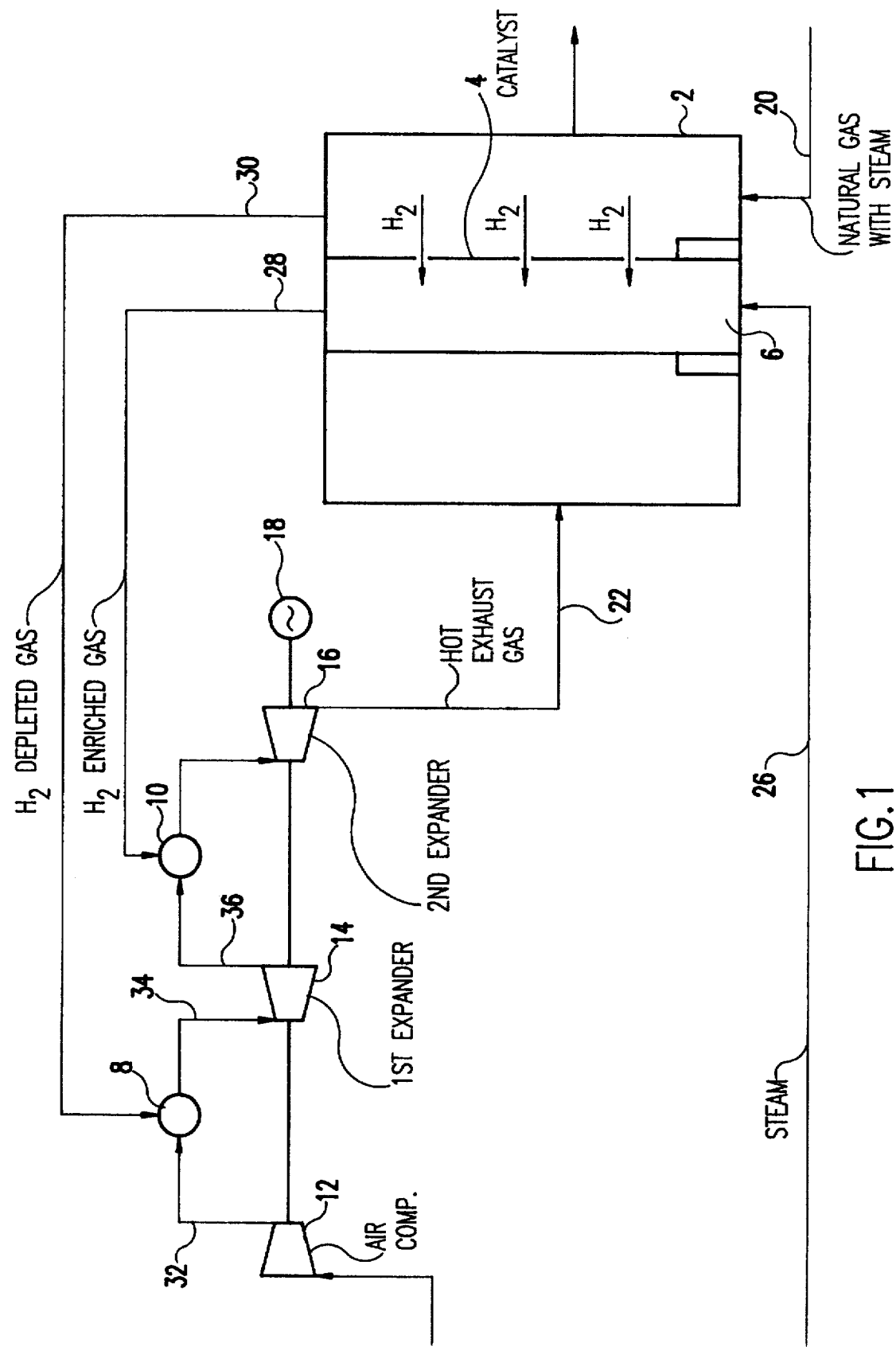

Steam reforming of hydrocarbon feed gas by heat exchange with hot gas in a heat exchange reactor and separation of hydrogen from gas mixtures are per se known measures.

Heat exchange reactors are conventionally used in the petrochemical industry for the production of synthesis gas and hydrogen. Those reforming reactors are usually of the bayonet tube type with an outer tube being closed at its outlet end and an open ended inner tube. An annulus being formed between the wall of the inner and outer tube is filled with steam reforming catalyst being in indirect heat conduct with hot gas on the outer tube wall and hot product gas on the inner tube wall.

Hydrogen separation is generally carried out by absorption or diffusion methods, such as molecular sieves absorption or palladium or palladium-silver membrane diffusion.

As mentioned above, the main advantage of chemically recuperated gas turbine cycles are utilization of heat from turbine exhaust gas for production of fuel with a higher fuel value than of the feed gas. This is obtained by using the hot exhaust gas as heat supply for steam reforming the feed gas to fuel gas with high fuel value. The steam reforming reactions proceeding thereby are limited by the below chemical equilibrium with respect to formation of $H_2$ and CO:

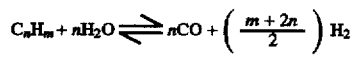

$$C_nH_m + nH_2O \rightleftharpoons nCO + \left(\frac{m+2n}{2}\right)H_2$$

In accordance with the above equilibrium reaction higher conversion of the feed will be obtained when removing $H_2$ continuously from the reacting feed. The equilibrium will thereby be pushed towards formation of $H_2$ and CO.

Continuous separation of hydrogen during catalytic steam reforming may advantageously be performed in any of the known membrane reactors with a fixed bed of steam reforming catalyst.

Those reactors are equipped with a hydrogen-permeable metal membrane on a porous ceramic layer.

The membrane is in the form of a tube being disposed in the catalyst bed. Hydrogen being produced during steam reforming permeates through the membrane tube and hydrogen enriched gas is swept from the tube together with a sweep gas, which usually is steam. As hydrogen is removed continuously from the reacting gas in the catalyst bed, hydrogen depleted gas is withdrawn from the bed.

When employing a membrane reactor in the inventive process, the hydrogen depleted gas from the catalyst bed is passed to a combustor in the first combustion stage. The gas leaves the reactor at high pressure as required for the combustion with compressed air in the first combustion stage.

The hydrogen enriched gas being withdrawn from the membrane tube at lower pressure than the gas from the catalyst bed is introduced into a combustor in the second combustion stage. In the second combustion stage, the hydrogen enriched gas is combusted with decompressed exhaust from the first expansion stage. The combustion gas from the second combustion stage is expanded to atmospheric or slightly higher pressure in the second expansion stage. Mechanical energy obtained by expansion of the combusted gas in gas turbines of the first and second expansion stage is transformed to electrical power in a rotating power generator, which is shaft connected to the gas turbines.

EXAMPLE 1

The Example represents a calculation model carried out on a chemically recuperative gas turbine cycle with hydrogen separation during steam reforming of natural gas in a membrane steam reforming reactor according to a specific embodiment of the invention.

The calculation model is depicted in the flow sheet shown in the attached FIG. 1.

The gas turbine cycle for use in the model consists of a membrane steam reforming reactor 2 with a catalyst bed 4 of a conventional nickel containing steam reforming catalyst and a palladium membrane tube 6. The cycle further consists of a first combustion unit 8 and second combustion unit 10, a first compression and expansion unit of an air compressor 12, a first expander 14 and a second expander 16, being shaft connected to each other and to a rotating power generator 18. Natural gas and steam is passed at a pressure of 40 atm. in line 20 to reforming reactor 2 and introduced into catalyst bed 4. The gas is steam reformed in catalyst bed 4 by contact with the steam reforming catalyst being in indirect heat conduct with hot exhaust from expander 16. The hot exhaust is thereby introduced to the reactor at a temperature of 765° C. and after heat exchange withdrawn at 636° C. through line 22.

During steam reforming of natural gas, a part of produced hydrogen permeates into membrane tube 6 as described above and hydrogen enriched gas is swept out of tube 6 with steam introduced through line 26. The hydrogen enriched gas having a composition of 43.6 vol % $H_2$ and 56.4 vol % $H_2O$ is passed in line 28 at 600° C. and a flow of 33407 $Nm^3/h$ to second combustor 10. Hydrogen depleted gas with the composition of $CH_4$ 22.1 vol %

$H_2$ 12.3 vol %

CO 1.8 vol %

$CO_2$ 17.7 vol %

$H_2O$ 45.9 vol %

$N_2$ 0.2 vol % is withdrawn from catalyst bed 4 at 600° C. and passed at a flow of 24,943 $Nm^3/h$ in line 30 to first combustor 8. The gas is introduced to combustor 8 at a pressure of 40 atm. and burned with compressed air 32. Hot combustion gas 34 is expanded in expander 14 providing thereby rotation energy. Exhaust 36 from expander 14 is burned with the hydrogen enriched gas in second combustor 10 at a pressure of 11 atm. The exhaust from combustor 10 is expanded in second expander providing further rotation energy. Rotation energy generated in expander 14 and 16 is transformed to 56 MW electrical power in rotating generator 18, whereas the energy content of natural gas being introduced to the cycle was 100 MW, resulting in a cycle efficiency of 56%.

Comparison Example

In a cycle similar to the above Example, the membrane steam reforming reactor was replaced by a reforming reactor without hydrogen separation.

Natural gas with an energy content of 100 MW was steam reformed to fuel gas of the composition of $CH_4$ 25.0 vol %

$H_2$ 18.3 vol %

CO 0.7 vol %

$CO_2$ 5.0 vol %

$H_2O$ 50.8 vol %

$N_2$ 0.2 vol %

As in Example 1, steam reforming was carried out in indirect heat exchange with hot exhaust 22 (702° C.), leaving the reactor after heat exchange at 641° C.

The fuel gas stream being withdrawn from the reactor at a flow of 33,661 $Nm^3/h$ and a temperature of 600° C. was then divided into a first fuel gas stream with 67% fuel value and a second fuel gas stream with 33% fuel value calculated on the fuel value of the fuel gas stream after steam reforming. The fuel gas streams were burned and expanded in a similar manner as in the Example 1. Electrical power obtained with the comparison cycle was 52 MW corresponding to an efficiency of 52%, which is 4% abs. lower than obtained in Example 1.

We claim:

1. Process for the generation of electrical power in a gas turbine comprising an air compression stage, first and second gas combustion stages and a series of first and second gas expansion stages providing mechanical power for the generation of electrical power in a rotating power generator, the process comprising the steps of:

operating the first combustion stage on hydrogen depleted fuel gas at high pressure and air from the air compression stage, the hydrogen depleted fuel gas being obtained by endothermic catalytic steam reforming of a hydrocarbon feed gas;

supplying heat for the endothermic catalytic steam reforming by indirect heat exchange with heat from hot exhaust gas from the second expansion stage;

separating hydrogen enriched gas from the hydrogen depleted fuel gas during the catalytic steam reforming of the hydrocarbon feed gas; and operating the second combustion stage on exhaust gas from the first expansion stage and the hydrogen enriched gas separated from the hydrogen depleted gas.

2. The process of claim, 1, wherein the hydrogen enriched gas is separated from the hydrogen depleted fuel gas by means of a hydrogen permeable membrane.

* * * * *